United States Patent [19]

Cardy

[11] 4,086,214

[45] Apr. 25, 1978

[54] PROCESS FOR PREPARING POLY(ε-CAPROLACTONE) POLYURETHANES

[75] Inventor: Charles Frederick Cardy, Luton, England

[73] Assignee: Interox Chemicals Ltd., London, England

[21] Appl. No.: 650,160

[22] Filed: Jan. 19, 1976

[30] Foreign Application Priority Data

Feb. 10, 1975 United Kingdom ............... 05603/75

[51] Int. Cl.² .................... C08G 18/42; C08G 18/18; C08G 18/22
[52] U.S. Cl. ..................... 260/77.5 AN; 260/18 TN; 260/75 NB; 260/75 NC; 260/75 NE; 260/75 NH; 260/858
[58] Field of Search ................... 260/858, 77.5 AN

[56] References Cited

U.S. PATENT DOCUMENTS

| 3,666,835 | 5/1972 | Schloss ............................... 260/858 |
| 3,775,354 | 11/1973 | Hostettler et al. .......... 260/77.5 AN |

*Primary Examiner*—H.S. Cockeram
*Attorney, Agent, or Firm*—Larson, Taylor and Hinds

[57] ABSTRACT

A process for the preparation of cast urethane rubbers by the reaction together of a diisocyanate, a polyol and a chain extender wherein the urethane is prepared by reacting together an isocyanate-rich quasi-prepolymer and an hydroxyl-rich prepolymer. The said quasi-prepolymer is formed by reacting all of the di-isocyanate with a part of the polyol and the said hydroxyl-rich prepolymer is formed by reacting all of the chain extender, the remaining part of the polyol and a part of the said quasi-prepolymer. The cast urethane rubbers find use in demanding applications like solid tires.

13 Claims, No Drawings

PROCESS FOR PREPARING POLY(ε-CAPROLACTONE) POLYURETHANES

This invention relates to a process for the preparation of urethane polymers and more particularly cast urethane rubbers.

It is known that urethane polymers can be prepared by reacting an isocyanate with a polyol, e.g. a polycaprolactone, and a chain extender, e.g. a diol or other polyol.

Urethane polymers have found application in industry in cast rubbers which show extremely good properties in terms of rebound resilience and compression set and this makes them particularly well suited to demanding applications like solid tyres.

There are three known processes by which cast urethane rubbers can be prepared; these have been termed one shot, total prepolymer and quasi prepolymer processes.

(a) One shot

This involves simultaneously mixing together the isocyanate, polyol and chain extender. One problem with this process is that it is difficult to accurately meter the chain extender, which represents only 7–12% by weight of the total mix, each time, into individual moulds. The chain extender controls the molecular weight of the product, and so influences its properties that even small differences in the amount of chain extender can lead to significant differences in the properties of the product. Consistent production can therefore be difficult to achieve by this process.

(b) Total Prepolymer

In this process all of the polyol is reacted with all of the isocyanate to form a prepolymer, which is then reacted with the chain extender. This process also suffers from the difficulty of achieving accurate addition of the chain extender, to individual moulds.

(c) Quasi prepolymer

In this process all the isocyanate is reacted with a portion only of the polyol to form a quasi-prepolymer. The remainder of the polyol is mixed with the chain extender to form a "resin mix". The quasi-prepolymer and the resin mix are then reacted in the required proportions to form the polyurethane. A problem with this process is that in many cases the chain extender is not completely soluble in the polyol so that the resin mix may be heterogeneous. This can result in errors in the proportions of reactants mixed and particularly of the chain extender, when metering aliquots of the resin mix and quasi-prepolymer into individual moulds.

All of the above procedures, although used in industry, require a high degree of expertise to operate efficiently. They are not well suited to small-scale unsophisticated operation. The principal problem with any urethane system is being able to mix sufficiently well to obtain uniform and reproducible rubbers. When using 4,4 diphenyl methane diisocyanate, and this is common for the preparation of urethane rubbers, butane 1:4 diol is commonly used as a chain extender and the latter tends to float on the surface of the other reactants. Unless it is very efficiently mixed, the butane diol can phase out during the cure of the urethane causing star cracks and non-uniform hardness and in extreme cases, stress cracking and fissuring.

All of the above procedures give urethane systems having long "pot lives", that is, the time during which the total reactant mix remains a pourable liquid, but the cure characteristics leave much to be desired. They usually proceed through a cheesy state which is difficult to demould, particularly from complex mouldings. Addition of catalysts to assist the cure to a rubber state usually results in a drop in the pot life. If sufficient catalyst is added to give demould times of 15–20 mins. the resultant pot life is only 1–2 mins. which is hardly practical for large moulds or for handling by unskilled labour.

The present invention provides a process for the preparation of urethane polymers by the reaction together of a diisocyanate, a polyol and a chain extender, wherein the urethane is prepared by reacting together in the required proportions in the liquid phase a quasi-prepolymer having unreacted isocyanate groups and a resin component having unreacted hydroxyl groups, said quasi-prepolymer being formed by reacting all of the diisocyanate with a part of the polyol such that a major proportion of the isocyanate groups remain unreacted, and said resin component being formed by reacting all of the chain extender, the remaining part of the polyol and a part of the quasi-prepolymer such that a major proportion of the hydroxyl groups remain unreacted.

The polyol for use in this invention may be selected from hydroxyl-terminated polyesters, for example, ethyleneglycol adipate, butyleneglycol adipate, ethylene-butyleneglycol adipate, hexylene glycol adipate, ethylene-glycol lactone adipate and the corresponding sebacates and azelates, hydroxyl-terminated polyethers, for example, polyethylene glycol, polypropylene glycol, polyethylene-propylene glycol and polytetrahydrofuran and hydroxyl-terminated lactone polyesters. A single polyol may be used or two or more polyols in combination may be used. For example, the same single polyol or the same physical mixture of polyols may be used in the preparation of both the quasi-prepolymer and the resin component or one polyol may be used in the preparation of the quasi-propolymer and a different polyol may be used in the preparation of the resin component. The quasi-prepolymer used in the preparation of the resin component may be same as or different from the quasi-propolymer which is reacted with the resin component to form the urethane polymer.

Advantageously, the polyol used is a hydroxyl-terminated lactone polyester containing at least two terminal hydroxyl groups. British Pat. No. 859642 describes suitable hydroxyl-terminated lactone polyesters and a process for their preparation.

The preferred hydroxyl-terminated lactone polyesters which may be used in this invention include polyesters of individual unsubstituted and substituted lactones, copolyesters of different substituted lactones and copolyesters of substituted and unsubstituted lactones, as well as blends thereof, wherein the lactone may be any lactone or combination of lactones, having at least six carbon atoms in the ring and represented by the general formula:

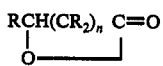

in which $n$ is at least 4, at least $n + 2$ R groups are hydrogen, and the remaining R groups are substituents selected from hydrogen, alkyl, cycloalkyl, alkoxy and single ring aromatic hydrocarbon radicals.

The most preferred hydroxyl-terminated lactone polyesters are those derived from epsilon-caprolactone having the formula:

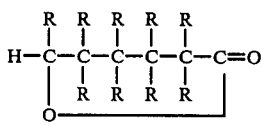

wherein at least six of the R groups are hydrogen, and the remainder are hydrogen, alkyl, cycloalkyl, alkoxy or single ring aromatic hydrocarbon radicals, and the total number of carbon atoms in the substituents on a lactone ring does not exceed about 12. Preferred epsilon-caprolactones are a methyl epsilon-caprolactone, a mixture of isomeric methyl epsilon-caprolactones or a mixture of isomeric methyl epsilon-caprolactone with epsilon-caprolactone.

Most particularly preferred are unsubstituted polyepsilon-caprolactone diols having molecular weights in the range 1000 to 3000.

Chain extenders which may be used include ethane diol, butane 1,4 diol, diethylene glycol and 1,4 bis-(2-hydroxyethoxy) benzene and mixtures thereof. Butane 1,4 diol is preferred. The amount of chain extender will depend primarily on its molecular weight and the properties required for the polymer e.g. hardness, but will generally be in the range 3–12 percent by weight of the urethane polymer, the lower part of the range being applicable to low molecular weight chain extenders, e.g. ethane diol.

The processing characteristics of the urethane system and the physical properties of the rubber product show some dependence on the particular chain extender used, e.g. diethylene glycol, when compared with butane 1,4 diol, tends to give urethane systems with longer pot lives and slower cures and the rubber product has higher tear strength. The use of mixtures of chain extenders allows some control over processing characteristics e.g. rates of cure, and over the physical properties of the rubber product.

Di-isocyanates which may be used include 4,4¹-di-isocyanato-diphenyl methane (MDI), tolylene di-isocyanates particularly dimerised tolylene di-isocyanates, di-isocyanate dicyclohexyl methane and hexamethylene di-isocyanate. MDI is particularly preferred, for example that sold under the code 125M by the Upjohn Company. Preferably the di-isocyanate is used in slight excess over the stoichiometric quantity required to react with all the hydroxyl groups, that is, the ratio of isocyanate groups to hydroxyl groups (hereinafter referred to as the NCO/OH index) is greater than 1.0. Most preferably there is an excess of 3–10 mole percent in the final product.

The apportionment of the total polyol component between the quasi-prepolymer and the resin component, and the quantity of quasi-prepolymer used in the preparation of the resin component, is such as to ensure that each of the quasi-prepolymer and the resin component is a homogeneous product.

In general it has been found most suitable for the apportionment of the polyol between the quasi-prepolymer and the resin component and the quantity of quasi-prepolymer used in the preparation of the resin component to be arranged as defined below:

| | |
|---|---|
| Let, parts by weight of di-isocyanate | = I |
| Let, parts by weight of polyol | = P |
| Let, parts by weight of chain extender | = E |
| Then I + P + E = 100 parts | |
| Let, parts by weight of polyol in quasi-prepolymer | = A |
| Let, parts by weight of polyol in resin component | = P − A |
| Let, parts by weight of quasi-prepolymer in resin component | = y |

Then weight ratio $$(I + A) / (P - A + E) = 3/1 \text{ to } 1.1737/1 \qquad (1)$$

and weight ratio $$(I + A - Y) / (P - A + E + y) = 2/1 \text{ to } 1/1 \qquad (2)$$

In the case where the di-isocyanate is MDI and the polyol is a poly-epsilon-caprolactone of molecular weight 2000 it has been found most preferable, when the chain extender is selected from butane 1,4 diol, ethane diol, diethylene glycol and 1,4 bis-(2hydroxy-ethoxy) benzene, that P is in the range 50–78 parts by weight depending on the hardness required for the urethane polymer in the preferred range of 70° to 95° Shore A, the higher amounts of polyol being used for the maximum hardness and that (a) when expression (1) = 1.1737/1,
then A/P × 100% by weight is in the range 29–48
y = 4 parts by weight
and y × 100/I + A = 7.5% by weight.
(b) when expression (1) = 3/1
then A/P × 100% by weight is in the range 67–78
y = 8.33 parts by weight
and y × 100/I + A = 11.1% by weight.

The reaction of the required amount of quasi-prepolymer with the chain extender and some of the polyol, to give the resin component, stabilises the chain extender and the composition remains homogeneous. Both the quasi-prepolymer and the resin component are stable in storage over long periods and thus both may be prepared in advance of requirement either by the urethane manufacturer or by the raw material supplier. The production of the urethane polymer merely requires the mixing in the liquid phase of the quasi-prepolymer and the resin component in the aforementioned proportions which are easily weighed or metered and the criticality of the mixing operation is reduced. Both the quasi-prepolymer and the resin component may be solid at temperatures up to 40° C or even higher, and thus will require heating to a temperature above their melting points before mixing.

In the preparation of the quasi-prepolymer, the temperature for the reaction between the di-isocyanate and polyol may be in the range 70° to 110° C, preferably 75° C to 90° C. In the preparation of the resin component the temperature for the reaction may be in the range 80° to 120° C, preferably 80° C to 90° C. It is preferable in the preparation of both the quasi-prepolymer and the resin component to carry out the reactions under dry nitrogen or partial vacuum to prevent the ingress of moisture and oxygen, the presence of which may give rise to undesirable side reactions.

For the preparation of urethane polymers by reaction between the quasi-prepolymer and the resin component, the reactants are suitbly mixed at a temperature of from 50° to 100° C, most preferably 80° C and the temperature is then raised, most preferably to from 100° to 120° C. Organometallic and/or amine catalysts known for urethane reactions may be employed in this reaction. Suitable organo-metallic catalysts are, for example, dibutyl tin dilaurate, stannous octoate, cobalt octoate, ferric acetonylacetonate, manganese naphthenate, phenyl mercuric oleate, phenyl mercuric propionate, lead stearate and tetraphenyl lead. Suitable amine catalysts are for example triethylenediamine, such as that sold under the trade name DABCO, aliphatic carboxylic acid salts thereof such as that sold under the trade name DABCO WT, diethanolamine, N-methyl diethanolamine, triethanolamine, di-isopropanolamine, tri-isopropanolamine and guanidines. The catalysts may be used singly or in combination, for example, two amine catalysts or two organometallic catalysts or an amine and an organometallic catalyst. Generally, the catalyst is added to the resin component. According to at least certain embodiments of the present invention it is advantageous to add the amine catalyst to the quasi-prepolymer and the organometallic catalyst to the resin component.

In the preparation of cast urethane rubbers according to this invention it is preferred to preheat the mixture of the quasi-prepolymer and the resin component to 80° C and then cast the mixture into preheated moulds at 110° C–120° C coated with a conventional release agent. After demoulding the rubber is preferably cured for 1 to 3 hours at 110° C–120° C and then post cured for several days at room temperature.

It is an advantage of at least certain embodiments of this invention that the urethane polymers have improved cure characteristics, in that they have satisfactory pot lives but nonetheless they cure faster and are thus easier to demould. It is an advantage of at least some embodiments of this invention that even catalysed systems have good pot lives.

Certain embodiments of the present invention will now be illustrated more fully by way of example. Examples 1, 2, 3 and 4 which relate to the known total prepolymer and quasi-prepolymer processes are comparative examples not within the scope of the invention.

In the examples, the methods of test used to measure the properties of the rubbers given in Tables 4, 5, 6 and 8 were as follows:

Hardness — according to ASTM D 2240 (DIN 53505) using a Shore A Meter manufactured by Bareiss — Germany.

| Ultimate tensile strength (UTS) | All according to BS 903 Part A2.1971 |
|---|---|
| Modulus | |
| Elongation at break | |

Tear strength — according to BS 903 Part A3.1972
Compression set — according to BS 903 Part A6.1969 (Method A)
Resilience — according to BS 903 Part A8.1963 (method B Lüpke pendulum).

EXAMPLES 1 and 2

The reactants used and the quantities of each taken are given in Table 1.

TOTAL PREPOLYMER PREPARATION (1) A reactor fitted with heating and stirring was charged with the given quantity of polyol and the temperature brought up to 60° C.

(2) The give quantity of molten MDI (125M Upjohn) at 40° C was added to the polyol with rapid stirring.

(3) Vacuum was applied to the reactor (20–30mm) to out gas the prepolymer. The head space volume of the reactor requires to be at least ⅓rd of the volume of the reactants.

(4) The temperature of the reactants was brought up to 95°–100° C and maintained at this temperature for 1 hour. Stirring was ceased for the last 15 mins. of this period. The vacuum was maintained throughout this step.

(5) The reactor was brought to atmospheric pressure with dry nitrogen.

(6) The product was then discharged and stored under dry nitrogen.

Preparation of a Rubber from Total Prepolymer

The given quantity of prepolymer at 80° C was weighed into a mixing vessel. The given amount of butane diol was added and mixed for 1 minute, and degassed. The liquid urethane was then cast into preheated moulds (110° C) coated with a release agent. The hot mould was placed in an oven at 110° C to 120° C. After 1 hour the resultant rubber was strong enough to be demoulded from a simple mould (a longer time is required for more complex mouldings). Immediately on demoulding the rubber was returned to the oven for 24 hours at 110° C, the rubber was then post cured for 14 days at room temperature (21° C) before testing.

EXAMPLES 3 and 4

The reactants used and the quantities of each taken are give in Table 1.

Quasi Prepolymer Preparation (1) A reactor fitted with heating and stirring was charged with the given quantity of polyol and the temperature brought to 60° C.

(2) The given quantity of molten MDI (125M) at 40° C was added to the polyol with rapid stirring.

(3) Vacuum was applied to the reactor (20–30mm) to out gas the prepolymer. The head space volume of the reactor requires to be at least ⅓rd of the volume of the reactants.

(4) The temperature of the reactants was brought up to 90° – 95° C and maintained at this temperature for 1 hour. Stirring was ceased for the last 15 mins. of this period. The vacuum was maintained throughout this step.

(5) The reactor was brought to atmospheric pressure with dry nitrogen.

(6) The product was then discharged and stored under dry nitrogen.

Resin mix for Quasi-prepolymer

The given quantities of polyol and butane diol were placed in a vessel fitted with heating and stirring and the temperature raised to 80° C under vacuum for 1 hour to degas the mixture.

Preparation of rubber from a quasi-prepolymer system

The given quantities of prepolymer and resin mix at 80° C were mixed for 1 minute and degassed. The resultant liquid urethane was poured into a preheated mould (110° C) coated with release agent. The hot mould was placed in an oven at 110° C to 120° C. After 1 hour the resultant rubber was strong enough to be demoulded from a simple mould (a longer time is required for more complex mouldings). Immediately on demoulding the rubber was returned to the oven for 24 hours at 110° C. The rubber was then post cured for 14 days at room temperature (21° C) before testing.

EXAMPLES 5-15

The reactants used and the quantities of each taken are given in Table 2 for 90° Shore A Systems and in Table 3 for 95° Shore A systems.

Preparation of Double Prepolymer System

Quasi-prepolymer: isocyanate-rich prepolymer (1) A reactor fitted with heating and stirring was charged with the given quantity of polyol and the temperature brought to 80° C.

(2) The given amount of molten MDI (125M) at 80° C was added to the polyol with rapid stirring. The reaction was exothermic. The temperature was controlled at 90° C for 2 hours. Vacuum (20–30mm) was applied to the reactor throughout.

(3) At the end of the 2 hours the reactor was brought to atmospheric pressure with dry nitrogen and the product discharged and stored under dry nitrogen.

Resin Component: hydroxyl-rich propolymer.

(1) The given quantities of polyol and chain extender were placed in a vessel with heating and stirring and the temperature raised to 110° C.

(2) The give quantity of quasi-prepolymer at 80° was then mixed in and reacted, the temperature being controlled over a period of 1 hour between 80° and 90° C. After 1 hour the product was degassed under vacuum. The pressure was then brought to atmospheric with dry nitrogen and the product discharged and stored under dry nitrogen.

Preparation of a rubber from the quasi-prepolymer and the resin component

The given quantity of resin component at 80° C was weighed into a suitable mixing vessel. Into this was mixed (1 minute) the given amount of quasi-prepolymer (at 80° C), care being taken not to entrain bubbles. The resulting liquid urethane was then cast into preheated moulds (110° C) coated with a release agent. The hot mould was placed in an oven at 110°–120° C for the required time. At the end of the time the rubber product was demoulded. Immediately on demoulding the rubber was returned to the oven. After this period of cure the rubber was post cured for 14 days at room temperature (21° C) before testing.

EXAMPLES 16 – 21

Preparation of Double Prepolymer System

Quasi-prepolymer: isocyanate-rich prepolymer (1) A reactor fitted with heating and stirring was charged with 26 g poly-epsilon-caprolactone diol MW 2000 and the temperature brought to 110° C.

(2) 30 g of molten MDI (125M) at 80° C was added to the polyol without stirring. After the addition the whole was stirred rapidly. The reaction was exothermic. The temperature was controlled at 80° C for 1 hour. Vacuum (20–30mm) was applied to the reactor throughout.

(3) At the end of the 1 hour the reactor was brought to atmospheric pressure with dry nitrogen and the product discharged and stored under dry nitrogen.

Resin Component: hydroxyl-rich prepolymer (1) 36.74 g of poly-epsilon-caprolactone diol MW 2000 and 7.26 g butane-1,4-diol were placed in a vessel with heating and stirring and the temperature raised to 110° C.

(2) 6.00 g of the quasi-prepolymer at 80° C was then mixed in and reacted, the temperature being controlled over a period of 1 hour between 80° and 90° C. After 1 hour the product was degassed under vacuum. The pressure was then brought to atmospheric with dry nitrogen and the product discharged and stored under dry nitrogen.

Preparation of a rubber from the quasi-prepolymer and the resin component

Details in respect of the temperature of mixing the quasi-prepolymer and the resin component, the catalysts used, pot life, demould times, and cure times are given in Tables 7 and 8.

1 part by weight of the resin component at the given temperature was weighed into a suitable mixing vessel together with the given catalyst. Into this was mixed (1 minute), at the given temperature, 1 part by weight of the quasi-prepolymer containing the given catalyst, care being taken not to entrain bubbles. The resulting liquid urethane was then cast into preheated moulds (110° C) coated with a release agent. The hot mould was placed in an oven at 110°–120° C for the required time. At the end of the time the rubber product was demoulded. Immediately on demoulding the rubber was returned to the oven at 110° C to cure for the given time. After this period of cure the rubber was post cured for 14 days at room temperature (21° C) before testing.

The results of the tests on all the rubbers are given in Tables 4, 5, 6 and 8. It will be seen from these Tables that rubbers having excellent physical properties are obtained by the process of the present invention.

TABLE 1

| | Reaction Systems of Examples 1 to 4 | | | |
|---|---|---|---|---|
| | 90 Shore A System | | 95 Shore A System | |
| Example | 1 | 3 | 2 | 4 |
| Prepolymer | | | | |
| MDI (parts by wt.) | 30 | 30 | 33.5 | 33.5 |
| Polyol (parts by wt.) | 62.74 | 20 | 57.92 | 16.5 |
| Mole % MDI reacted | 26.14 | 8.33 | 21.65 | 6.15 |
| Resin Mix | | | | |
| Polyol (parts by wt.) | — | 42.74 | — | 41.42 |
| Butane 1,4 diol (parts by wt.) | 7.26 | 7.26 | 8.58 | 8.58 |
| Mix ratio, Prepolymer: Resin Mix | 12.7/1 | 1/1 | 10.6/1 | 1/1 |
| Catalyst | None | None | None | None |

The polyol used was poly-epsilon-caprolactone diol molecular weight = 2000.

Table 2

| | Reaction Systems of Examples 5 – 12 90° Shore A | | | | | | | |
|---|---|---|---|---|---|---|---|---|
| Example | 5 | 6 | 7 | 8 | 9 | 10 | 11 | 12 |
| Quasi-prepolymer (A) | | | | | | | | |
| MDI | 30 | 30 | 30 | 30 | 32.4 | 32.4 | 34 | 32 |

Table 2-continued

Reaction Systems of Examples 5 - 12
90° Shore A

| Example | 5 | 6 | 7 | 8 | 9 | 10 | 11 | 12 |
|---|---|---|---|---|---|---|---|---|
| Polyol | 45 | 26 | 24 | 26 | 23.6 | 23.6 | 22 | 24 |
| % by wt of total polyol component | 71.7 | 41.4 | 38.2 | 41.4 | 40.1 | 40.1 | 39.6 | 43.3 |
| Mole % MDI reacted | 18.75 | 10.83 | 10.0 | 10.83 | 18.2 | 18.2 | 16.2 | 18.75 |
| Resin Component (B) | | | | | | | | |
| Polyol | 17.74 | 36.74 | 38.74 | 36.74 | 35.21 | 35.21 | 33.57 | 31.45 |
| Butane 1,4 diol | 7.26 | 7.26 | 7.26 | 7.26 | 4.84 | 4.84 | — | — |
| Diethylene glycol | — | — | — | — | 3.95 | 3.95 | 10.43 | 6.28 |
| 1,4-bis (2-hydroxy ethoxy) benzene | — | — | — | — | — | — | — | 6.28 |
| Quasi-prepolymer (A) | 8.33 | 6.00 | 4.00 | 6.00 | 6.00 | 6.00 | 6.00 | 6.00 |
| % by wt quasi-prepolymer (A) transferred | 11.1 | 10.7 | 7.4 | 10.71 | 10.71 | 10.71 | 10.71 | 10.71 |
| Mole % of hydroxyl groups reacted | 12.1 | 11.62 | 8.0 | 11.62 | 11.62 | 11.62 | 11.62 | 11.62 |
| Mix ratio A:B | 2/1 | 1/1 | 1/1 | 1/1 | 1/1 | 1/1 | 1/1 | 1/1 |
| Catalyst | None | None | None | Yes | None | Yes | None | None |

The polyol used was poly-epsilon caprolactone diol molecular weight = 2000. The catalyst used in Examples 8 and 10 was phenyl mercuric oleate. The figures given above are parts by weight unless otherwise stated.

Table 3

Reaction Systems of Examples 13 - 15
95° Shore A

| Example | 13 | 14 | 15 |
|---|---|---|---|
| Quasi-prepolymer (A) | | | |
| MDI | 33.5 | 33.5 | 33.5 |
| Polyol | 41.5 | 22.5 | 22.5 |
| % by wt of total polyol component | 71.65 | 38.8 | 38.8 |
| Mole % MDI reacted | 15.5 | 8.4 | 8.4 |
| Resin Component (B) | | | |
| Polyol | 16.42 | 35.42 | 35.42 |
| Butane 1,4 diol | 8.58 | 8.58 | 8.58 |
| Quasi-prepolymer (A) | 8.33 | 6.00 | 6.00 |
| % by wt quasi-prepolymer transferred | 11.1 | 10.7 | 10.7 |
| Mole % of hydroxyl groups reacted | 12.2 | 12.0 | 12.0 |
| Mix ratio A:B | 2/1 | 1/1 | 1/1 |
| Catalyst | None | None | Yes |

The polyol used was poly-epsilon-caprolactone diol molecular weight = 2000. The catalyst used in Example 15 was phenyl mercuric oleate. The figures given above are parts by weight unless otherwise stated.

Table 4

Properties of the Rubber Products of Examples 1 to 4

| | 90 Shore A System | | 95 Shore A System | |
|---|---|---|---|---|
| Example | 1 | 3 | 2 | 4 |
| Pot life at 80° C mins | 7–8 | 7–8 | 6 | 4–5 |
| Demould time at 110° C mins | 60 | 30 | 60 | 45 |
| Cure temp. ° C/time (hrs) | 110/24 | 110/24 | 110/24 | 110/24 |
| Index (NCO/OH) | 1.07 | 1.07 | 1.07 | 1.07 |
| Hardness Shore A | 90 | 92 | 95 | 95 |
| 100% Modulus kg/cm$^2$ | 82 | 79 | 93 | 99 |
| 300% Modulus kg/cm$^2$ | 155 | 136 | 244 | 166 |
| UTS kg/cm$^2$ | 530 | 575 | 545 | 467 |
| % Elongation at break | 400 | 575 | 440 | 470 |
| Tear strength Die C. kg/cm | 97 | 93 | 109 | 97 |
| Compression Set at 70° C (%) | 10 | 10 | 8–10 | 16 |
| Resilience (%) at 20° C | 55 | 52 | 52 | 55 |

Table 5

Properties of the Rubber Product of Examples 5 - 12

| Examples | 5 | 6 | 7 | 8 | 9 | 10 | 11 | 12 |
|---|---|---|---|---|---|---|---|---|
| Pot life at 80° C mins. | 7–8 | 7–8 | 7–8 | 4 | 8–9 | 7 | 15 | 5 |
| Gel time, mins. | — | — | — | — | 20 | 14 | — | — |
| Demould time at 110° C min. | 30 | 30 | 30 | 15 | 40 | 30 | 60 | 30 |
| Cure temp. ° C/time (hrs) | 110/— | 110/— | 110/— | 110/3 | 110/— | 110/3 | 110/— | 110/— |
| Index (NCO/OH) | 1.07 | 1.07 | 1.07 | 1.07 | 1.07 | 1.07 | 1.07 | 1.07 |
| Hardness, Shore A | 92 | 90 | 90 | 92 | 90 | 92 | 91 | 92 |
| 100% Modulus kg/cm$^2$ | 76 | 84 | 73 | 75 | 50 | 73 | 70 | 83 |
| 300% Modulus kg/cm$^2$ | 170 | 166 | 185 | 169 | 172 | 118 | 203 | 170 |
| UTS kg/cm$^2$ | 422 | 539 | 532 | 554 | 598 | 596 | 508 | 468 |
| % Elongation at break | 415 | 440 | 400 | 460 | 390 | 410 | 470 | 460 |
| Tear strength Die C. kg/cm. | 69 | 67 | 85 | 86 | 54 | 76 | 98 | 84 |
| Compression set at 10° C (%) | 14 | 12 | 11 | 10 | 20 | 8 | — | — |
| Resilience (%) at 20° C | 55 | 62 | 60 | 62 | 52 | 55 | 28 | 52 |

Table 6

Properties of the Rubber Products of Examples 13 - 15
95° Shore A

| Example | 13 | 14 | 15 |
|---|---|---|---|
| Pot life at 80° C mins | 4–5 | 4 | 3–4 |
| Demould time at 110° C min. | 45 | 45 | 15–20 |
| Cure temp. ° C/time (hrs) | 110/— | 110/— | 110/3 |
| Index (NCO/OH) | 1.07 | 1.04 | 1.04 |
| Hardness, Shore A | 95 | 95 | 95 |
| 100% Modulus kg/cm$^2$ | 98 | 109 | 100 |
| 300% Modulus kg/cm$^2$ | 240 | 230 | 207 |
| UTS kg/cm$^2$ | 459 | 435 | 567 |
| % Elongation at break | 360 | 400 | 440 |
| Tear strength Die C. kg/cm | 125 | 108 | 114 |
| Compression set at 70° C(%) | 8–10 | 8 | 8 |
| Resilience (%) at 20° C | 52 | 54 | 55 |

Table 7

Details of rubber preparations Examples 16 - 21

| Example | 16 | 17 | 18 | 19 | 20 | 21 |
|---|---|---|---|---|---|---|
| Catalyst* in quasi-prepolymer | None | 0.1 MDEA | None | None | 0.33 TIPA | 0.33 TIPA |
| Catalyst** in resin component | 0.4MDEA 0.0012 CO | 0.0003 CO | 0.32 TIPA 0.0006 CO | 0.54 TEA | 0.4 CO | 0.4 CO |
| Temperature of mixing (° C) | 80 | 80 | 80 | 80 | 80 | 50 |
| Index (NCO/OH) | 1.04 | 1.04 | 1.04 | 1.04 | 1.04 | 1.04 |

*% by weight on weight of quasi-prepolymer
**% by weight on weight of resin component
MDEA = N-methyl-diethanolamine
TIPA = Tri-isopropanolamine
TEA = Triethanolamine
CO = Cobalt octoate Table 8

Properties of the Rubber Products of Examples 16 - 21

| Example | 16 | 17 | 18 | 19 | 20 | 21 |
|---|---|---|---|---|---|---|
| Pot life (mins) | 3 | 4 | 3 | 3½–4 | 1½ | 6 |
| Demould time (mins) | 20 | 15 | 20 | 30 | 10 | 15 |
| Cure time (hour) at 110° C | 1 | 1 | 2 | 1 | 2 | 2 |
| Hardness Shore A | 91 | 90 | 90 | 92 | 90 | 90 |
| 100% Modulus kg/cm$^2$ | 79 | 78 | 79 | 79 | 68 | 65 |
| 300% Modulus kg/cm$^2$ | 156 | 170 | 209 | 178 | 166 | 200 |
| UTS kg/cm$^2$ | 437 | 480 | 528 | 487 | 460 | 535 |
| % Elongation at break | 370 | 440 | 370 | 440 | 380 | 420 |
| Tear strength Die C. kg/cm | 74 | 76 | 68 | 75 | 77 | 91 |
| Compression Set at 70° C (%) | 17 | 20 | 18 | 17 | 16 | 16 |
| Resilience (%) at 20° C | 50 | 53 | 50 | 60 | 60 | 62 |
| Resilience (%) at 50° C | 65 | 69 | 64 | 72 | 72 | 73 |

What is claimed is:

1. A process for the preparation of urethane polymers by the reaction together of a diisocyanate, a poly (ε-caprolactone)diol having a molecular weight in the range of from 1000 to 3000 and a chain extender, which comprises the steps of:
    (a) forming an isocyanate-rich quasi-prepolymer by reacting all of the diisocyanate with a part of the poly(ε-caprolactone)diol such that a major proportion of the isocyanate groups remain unreacted,
    (b) forming an hydroxyl-rich prepolymer by reacting all of the chain extender and the remaining part of the poly(ε-caprolactone)diol with sufficient of the said quasi-prepolymer such that a major proportion of the hydroxyl groups remain unreacted, and
    (c) mixing in the liquid phase the said quasi-prepolymer with the said hydroxyl-rich prepolymer and reacting the said quasi-prepolymer with the said hydroxyl-rich prepolymer to give a urethane polymer.

2. A process according to claim 1 wherein the chain extender is selected from the group consisting of ethane diol, butane-1,4-diol, diethylene glycol and 1,4-bis-(2-hydroxy-ethoxy)-benzene.

3. A process according to claim 1 wherein the diisocyanate is 4,4'-diisocyanato-diphenylmethane.

4. A process according to claim 1 wherein in step (c), is present an organo-metallic catalyst selected from the group consisting of dibutyl tin laurate, stannous octoate, cobalt octoate, ferric acetonylacetonate, manganese naphthenate, phenyl mercuric oleate, phenyl mercuric propionate, lead stearate and tetraphenyl lead.

5. A process according to claim 1 wherein in step (c), is present an amine catalyst selected from the group consisting of triethylenediamine and aliphatic carboxylic acids salts thereof, diethanolamine, N-methyl diethanolamine, triethanolamine, di-isopropanolamine, tri-isopropanolamine and guanidines.

6. A hydroxyl-rich prepolymer for use in the preparation of urethane polymers from a diisocyanate, a poly(ε-caprolactone)diol having a molecular weight in the range of from 1000 to 3000 and a chain extender, said hydroxyl-rich prepolymer comprising the reaction product of
    (1) a portion of a quasi-prepolymer which is the reaction product of all of said diisocyanate and a part of said poly(ε-caprolactone)diol in which quasi-prepolymer a major portion of the isocyanate groups are unreacted;
    (2) all of said chain extender; and
    (3) the remaining part of said poly(ε-caprolactone)-diol,
wherein a major proportion of the hydroxyl groups of said prepolymer are unreacted.

7. A hydroxy-rich prepolymer of claim 6 wherein the weight ratios $$(I + A)/(P - A + E) = 3/1 \text{ to } 1.1737/1$$

and $$(I + A - y)/(P - A + E + y) = 2/1 \text{ to } 1/1$$

where
$I$ = parts by weight of the diisocyanate
$P$ = parts by weight of the polyol
$E$ = parts by weight of the chain extender and $I + P + E = 100$ parts;

$A$ = parts by weight of the poly(ε-caprolactone)diol in the quasi-prepolymer $P - A$ = parts by weight of the poly(ε-caprolactone)diol in the hydroxyl-rich prepolymer and $y$ = parts by weight of the quasi-prepolymer in the hydroxyl-rich prepolymer.

8. The prepolymer according to claim 6 wherein the chain extender is selected from the group consisting of ethane diol, butane-1,4-diol, diethylene glycol and 1,4-bis-(2-hydroxyethoxy)-benzene.

9. The prepolymer according to claim 6 wherein the diisocyanate is 4,4'-diisocyanato-diphenylmethane.

10. A process for the preparation of urethane polymers by the reaction together of I parts by weight of a diisocyanate, P parts by weight of a poly(ε-caprolactone)diol having a molecular weight in the range of from 1000 to 3000 and E parts by weight of a chain extender, which comprises the steps of (a) forming an isocyanate-rich quasi-prepolymer by reacting all of the diisocyanate with A parts by weight of the poly(ε-caprolactone)diol such that a major proportion of the isocyanate groups remain unreacted, (b) forming an hydroxyl-rich prepolymer by reacting all of the chain extender and the remaining part of the poly(ε-caprolactone)diol with $y$ parts by weight of the said quasi-prepolymer such that a major proportion of the hydroxyl groups remain unreacted, and (c) mixing in the liquid phase the said quasi-prepolymer with the said hydroxyl-rich prepolymer and reacting the said quasi-prepolymer with the said hydroxy-rich prepolymer to give a urethane polymer, the values of I, P, A, $y$ and E being such that $I + P + E = 100$, $(I + A)/(P - A + E) = 3/1$ to $1.1737/1$, and $(I + A - y)/P - A + E + y) = 2/1$ to $1/1/$.

11. A process according to claim 10 wherein in step (a) the reaction is carried out at a temperature in the range of from 70° C to 110° C.

12. A process according to claim 10 wherein in step (b) the reaction is carried out at a temperature in the range of from 80° C to 120° C.

13. A process according to claim 10 wherein in step (c) the reactants are first mixed at a temperature in the range of from 50° C to 100° C and the reaction is then carried out at a temperature in the range of from 100° C to 120° C.

* * * * *